United States Patent [19]

Regnier et al.

[11] 4,245,005

[45] Jan. 13, 1981

[54] PELLICULAR COATED SUPPORT AND METHOD

[75] Inventors: Frederick E. Regnier, West Lafayette; Andrew J. Alpert, Lebanon, both of Ind.

[73] Assignee: Purdue Research Foundation, West Lafayette, Ind.

[21] Appl. No.: 16,031

[22] Filed: Feb. 28, 1979

[51] Int. Cl.³ .................... B01D 15/08; B05D 3/14; G01N 31/08
[52] U.S. Cl. .................... 428/420; 55/67; 55/386; 210/198 C; 210/502; 427/220; 427/301; 428/446; 428/539; 252/426
[58] Field of Search ............ 428/411, 420, 446, 539; 427/220, 301; 55/67, 386; 210/31 C, 198 C, 502

[56] References Cited

U.S. PATENT DOCUMENTS

| 3,892,678 | 7/1975 | Halasz et al. | 55/386 X |
|---|---|---|---|
| 3,983,299 | 9/1976 | Regnier | 55/386 X |
| 4,029,583 | 6/1977 | Chang et al. | 55/386 X |
| 4,140,653 | 2/1979 | Imura et al. | 55/386 X |

*Primary Examiner*—Harold Ansher
*Attorney, Agent, or Firm*—John R. Nesbitt

[57] ABSTRACT

A pellicular coated support and method for producing such a support are disclosed. The support includes a thin layer of adsorbate that is adsorbed to and crosslinked on an inorganic support material with the thus formed support being particularly well suited for use in liquid chromatography. An inorganic support of silica, alumina or titania has the pellicular coating formed thereon with the coating being an amine that is crosslinked by a crosslinking agent of epoxy resin, bromide or nitro alcohol.

38 Claims, 8 Drawing Figures

PELLICULAR COATED SUPPORT AND METHOD

FIELD OF THE INVENTION

This invention relates to a pellicular coated support and method for forming the same and, more particularly, relates to an ion-exchange support having a thin coating thereon that is particularly well suited for liquid chromatography.

BACKGROUND OF THE INVENTION

In modern high performance liquid chromotography (HPLC), pressures of several thousand lb/in$^2$ are often developed within the chromatography columns. This requires that the column packing materials be rigid and non-collapsible. To achieve this, porous inorganic materials, such as silica and alumina, have heretofore been utilized as the support material with organic stationary phases on the surface to obtain a variety of liquid chromatography column packing materials.

Previously prepared porous chromatographic packings with a stationary organic phase have used covalent bonding to attach the organic phase to the support surface. The coupling of an organic phase (P) to the surface of an inorganic support has been achieved through the use of an intermediate silane coupling agent wherein the silicone portion of the molecule is bonded to the support and the organic portion of the organosilane either is the organic phase or is attached to the organic phase. Such inorganic supports are shown, by way of example, in U.S. Pat. Nos. 3,983,299 and 4,029,583.

The primary function of the coupling agent is to provide a chemical bond between the inorganic support and the stationary organic phase (P) that is responsible for the chromatographic partitioning. The general chemical formula for this composite may be expressed as:

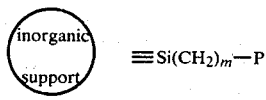 $\equiv Si(CH_2)_m - P$ where $\equiv Si$ indicates that three of the bonds on silica are bonded directly to the inorganic support or to adjacent organosilanes that are bonded to the support, $-(CH_2)_m-$ is a coupling arm that ties the rest of the stationary phase (P) to the support, and m is a number ranging from 0 to 18.

In the preparation of chromatography packings it is necessary to strive for exact reproduction of the organic coating from batch to batch. It has been observed, however, that when an inorganic support is treated with a solution of organosilane it is difficult to reproducibly control the amount of organosilane that is deposited on the surface, particularly since many ways have been developed whereby organosilanes may be bonded to an inorganic surface. Chromatographically, the amount of organosilane deposited on the surface of an inorganic support is quite important. The chromatographic behavior of a bonded phase packing material is totally dependent on the nature and amount of organic material on the particle.

A further disadvantage of the organosilane bonding chemistry is that the bonded phase has been found to erode. As columns are operated and hundreds of column volumes of mobile phase pass through the column, organosilane hydrolysis can occur as follows:

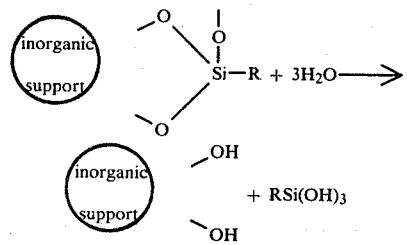

Although this reaction can be quite slow, it can still produce a substantial degradation in a relatively short period of time, as for example, in one month of continuous operation.

SUMMARY OF THE INVENTION

This invention provides a pellicular coating on a support material and a method for producing the same. A thin layer of organic adsorbate is adsorbed to and cross-linked on the surface of the inorganic support material with the thus formed support being particularly well suited for use in liquid chromatography with the adsorbed layer being the stationary phase. By use of this invention, the coated support is reproducible with controlled and uniform coating thickness and the thus provided support is stable in operation.

It is therefore an object of this invention to provide an improved support having a pellicular coating thereon.

It is another object of this invention to produce an improved support having a pellicular coating thereon that is stable and reproducible.

It is yet another object of this invention to produce an improved chromatographic support.

It is still another object of this invention to produce an improved support having a thin layer on support material with the layer being adsorbed to and cross-linked on the surface of said support material.

It is yet another object of this invention to provide an improved packing material that includes an inorganic support material having an adsorbate adsorbed to and crosslinked on the surface of said support material.

It is still another object of this invention to provide an improved process for producing a pellicular coating on a support material.

It is yet another object of this invention to provide an improved process for adsorbing a thin layer to a support material and crosslinking the layer thus formed on said support material.

It is still another object of this invention to provide an improved process for providing a pellicular layer on a support material by contacting the support material with an adsorbate so that the adsorbate is adsorbed on the surface of the support material to form a coating thereon that is crosslinked by exposure to a crosslinking agent.

With these and other objects in view which will become apparent to one skilled in the art as the description proceeds, this invention resides in the novel support apparatus and method for forming the same substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate the invention and/or achieved results thereof according to the best mode so far devised for the practical application of the principles thereof, and in which.

DESCRIPTION OF THE INVENTION

Figure 1:
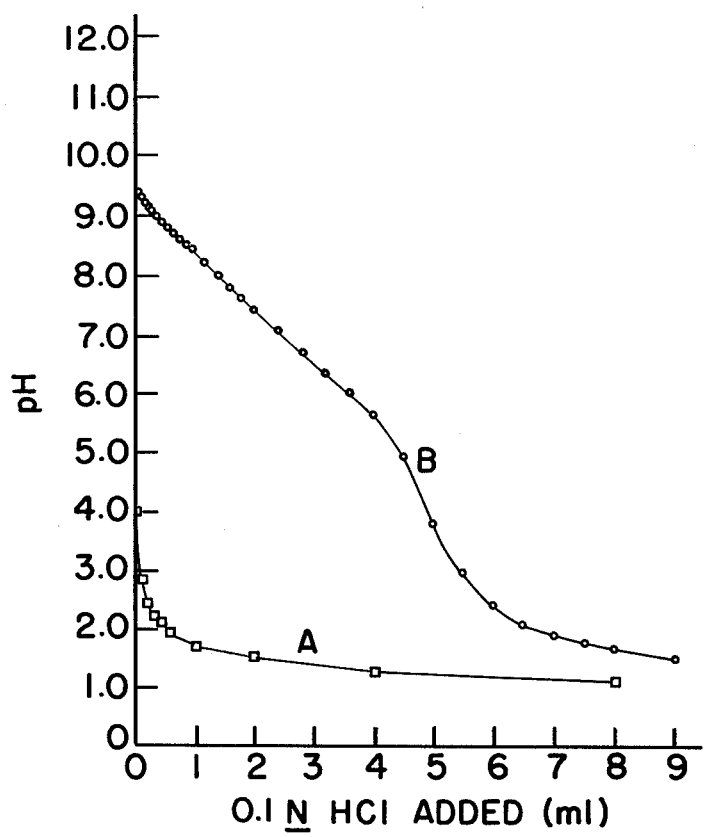
FIG. 1 is a graph illustrating titration curves (pH with respect to HCl)

This invention is particularly directed toward achieving an adsorbate layer on a support material that is reproducible with respect to thickness and uniformity as well as achieving stability during operation for the thus produced support or packing material.

It is widely accepted in physical chemistry that the concentration of a solute at a liquid-solid interface can be greater than that in the bulk solution. This adsorption onto surfaces may be expressed by the equation:

$$S = -\frac{C}{RT} \cdot \frac{dr}{dc}$$

where S is the excess concentration of solute/cm² of surface, dr/dc is the rate of increase of surface tension of the solution with the concentration of the solute, R is the gas constant, C is solute concentration to solution, and T is absolute temperature. Any substance which decreases the surface tension at an interface will concentrate at that interface.

In the event that this adsorption from solution leads to the formation of a single layer of solute molecules on the surface of the solid, the equation $a = kC^n$ provides an adequate description of the adsorption process over a wide range of concentrations where a is the amount of solute adsorbed by a unit mass of adsorbent, C is solute concentration in the solution, and the terms k and n are constants for a given adsorbent and adsorbate.

By controlling the polarity of the solvent the adsorption of polar solutes onto surfaces can be controlled. The less polar the solvent, the stronger the adsorption. With a polarized surface (designated as $P_s^{\delta-}$) and a solvent (designated as $P_m^{\delta+}$), then the adsorption of solute (designated as $S^{\delta+}$) to the surface may be described as follows:

$$P_s^{\delta-} + S^{\delta+} \rightleftharpoons P_s^{\delta-} - S^{\delta+}$$

while the adsorption of polar solvent may be described by the equation:

$$P_s^{\delta-} + P_m^{\delta+} \rightleftharpoons P_s^{\delta-} - P_m^{\delta+}$$

Both $P_m^{\delta+}$ and $S^{\delta+}$ are obviously competing for the surface $P_s^{\delta-}$. The ultimate composition on a surface depends on the relative affinities of the different components for the surface and their concentrations.

When the affinity of an organic solute (designated as R) is sufficiently large, the surface will become saturated with a layer of organic molecules R ranging from one to a few molecules thick. This technique provides a convenient method for organizing molecular films on a surface that are very thin and uniform. Accumulation of organic molecules R on the surface is self-limiting; when all active sites on the surface are covered, adsorption ceases. These thin, reproducible films are highly desirable in both the preparation and use of chromatography supports.

It is apparent, however, that an adsorbed organic layer might not have adequate long-range stability in a chromatographic column when the support is eluted with thousands of column volumes of solvent. A gradual leaching of even the most tenaciously adsorbed solutes would occur.

In this invention, adsorption is used to establish films of organic molecules on surfaces followed by stabilization of this film through covalent crosslinking of adjacent molecules into a continuous surface skin or layer. By this crosslinking process, the solubility of the adsorbed films of organic molecules is substantially decreased and the number of adsorption sites at which desorption must occur simultaneously to elute the coating is greatly increased.

Preparation of adsorbed organic phase supports has been achieved by a synthetic route in which the organic phase is adsorbed directly to the surface of native inorganic support materials. Adsorption may occur through ionic forces, van der Waals forces, and/or hydrogen bonding between organic functional groups and the surface. To prevent this adsorbed layer from eluting, adjacent organic groups are crosslinked. These supports will be referred to as simple adsorbed and crosslinked phases.

In simple adsorbed and crosslinked phases, adsorption of a surface monolayer of organic compound may be represented schematically as follows:

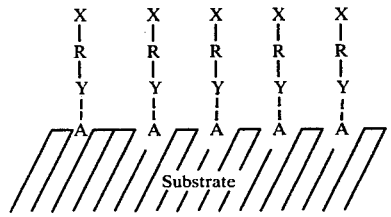

where A is a site on the substrate surface that has an affinity for an organic adsorbate, Y is a functional group on the organic adsorbate that interacts with A to cause the adsorption of the whole organic moiety to the surface, R is an organic compound as described above, and X is a functional group on R that is used to crosslink adjacent adsorbed species.

It is important that each adsorbate be capable of participating in at least two crosslinking reactions to produce high molecular weight pellicular layers. In a general model, the adsorbate may be represented as:

$$(Y)_m-R-(X)_m$$

where Y and X may be the same or different functional groups and m and n may vary from 1 to several thousand.

Crosslinking of adjacent adsorbate molecules was achieved with a crosslinker described by the general formula:

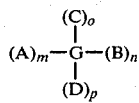

A and B are functional groups on the crosslinker molecule G that react with X on the adsorbate to produce chemical bonds that couple adsorbate molecules together on the surface. Species A and B may be the same or different functional groups while m and n may vary from 1 to several hundred. On occasion it may be desirable to further modify the properties of the organic stationary phase to facilitate its use in chromatography.

By using a crosslinking agent G that has additional organic moieties C and D covalently bonded, it is possible to change the chromatographic properties of a packing without changing all of the bonding chemistry. The number of C and D ligands represented by o and p may vary from zero to several hundred in a crosslinking molecule.

EXAMPLE 1

Preparation of a Polyethyleneimine Coating on Porous Silica 4 grams of LiChrospher Si 500 (10 micron particle diameter) were swirled in a solution of 1.5 grams of polyethyleneimine 6 (average molecular weight=600) in 15 ml of methanol. Air was removed from the pores of the support with a light vacuum. The silica was collected by filtration and air-dried for 40 minutes on a reduced-pressure funnel. The coated silica was again swirled and degassed in a crosslinking solution, which consisted of 1.25 grams of pentaerythritol tetraglycidyl ether dissolved in 12.5 ml of dioxane. The mixture was left for 16 hours at room temperature, then heated on a steambath for 40 minutes with swirling at 10-minute intervals. The product was collected by filtration and washed several times each with acetone, water, and again acetone, then air dried.

The resulting coated silica was assayed for its capacity to bind and release both small molecules (picric acid) and macromolecules (hemoglobin) in solution. the ion-exchange capacity (IEC) for picric acid was 1.32 millimoles per gram of coated support while that for hemoglobin was 65 milligrams per gram of coated support.

Elemental analysis of the coated silica showed 5.59% C, 1.29% H and 2.26% N. When the oxygen (approximately 1.3%) is included, it is seen that the coating makes up 10% of the mass of the product. The ratio of C to N suggests that 21% of the nitrogen residues are crosslinked. Comparing the IEC for picric acid and elemental analysis shows that 77% of the nitrogen residues were detected by the picric acid assay and thus can participate in ion-exchange.

250 milligrams of coated support were suspended in 10 ml of 1 molar NaCl and titrated with 0.1 normal HCl. The resulting change in pH of the suspension, as shown in FIG. 1, illustrates that the material functions as a weak anion exchanger, with charge decreasing in a continuum over the pH range 0–9. As shown in FIG. 1 of titration curves in 1 M NaCl, A is LiChrosorb Si 100 (10-micron particle diameter), 0.25 g and B is LiChrosorb Si 100 (10-micron particle diameter) with a coating of polyethyleneimine 6: 0.25 g with an IEC=495 micromoles of picric acid.

Figure 2:
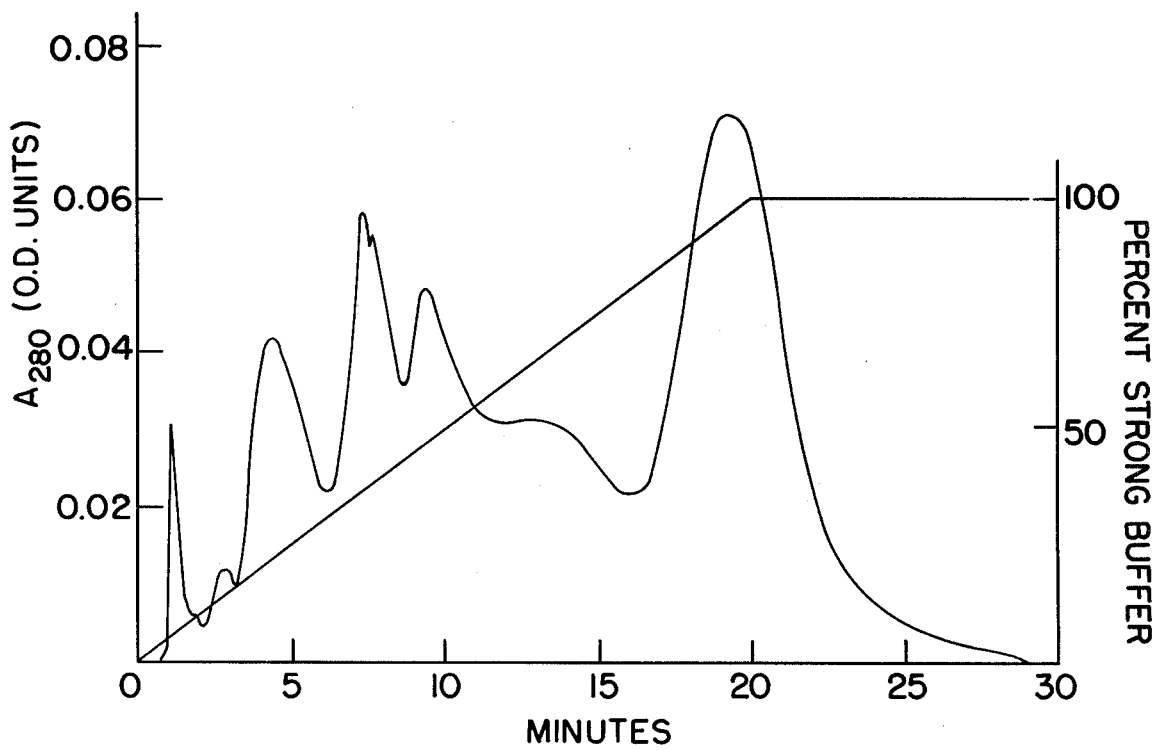
FIG. 2 is a graph illustrating resolution of human serum protein.

Polyethyleneimine-coated silica was packed into 4.2 mm×25 cm columns in the form of a slurry. Columns packed with coated large-pore silicas (LiChrospher Si 500; 10-micron particle diameter) were used to resolve mixtures of proteins. Resolution of human serum proteins is shown in FIG. 2. In FIG. 2, the column was polyethyleneimine-coated LiChrospher Si 500 (10-micron particle diameter), 25×0.4 cm; the sample was 100 μl of human serum, diluted 33%; the eluent was 20 min linear gradient; 0.02 M Trisacetate, pH 8.0, to 0.02 M Tris-acetate+0.5 M sodium acetate, pH 8.0; the flow rate was 2.0 ml/min.; the inlet pressure was 1400 psi and the detection was $A_{280}$ monitored.

Figure 3:
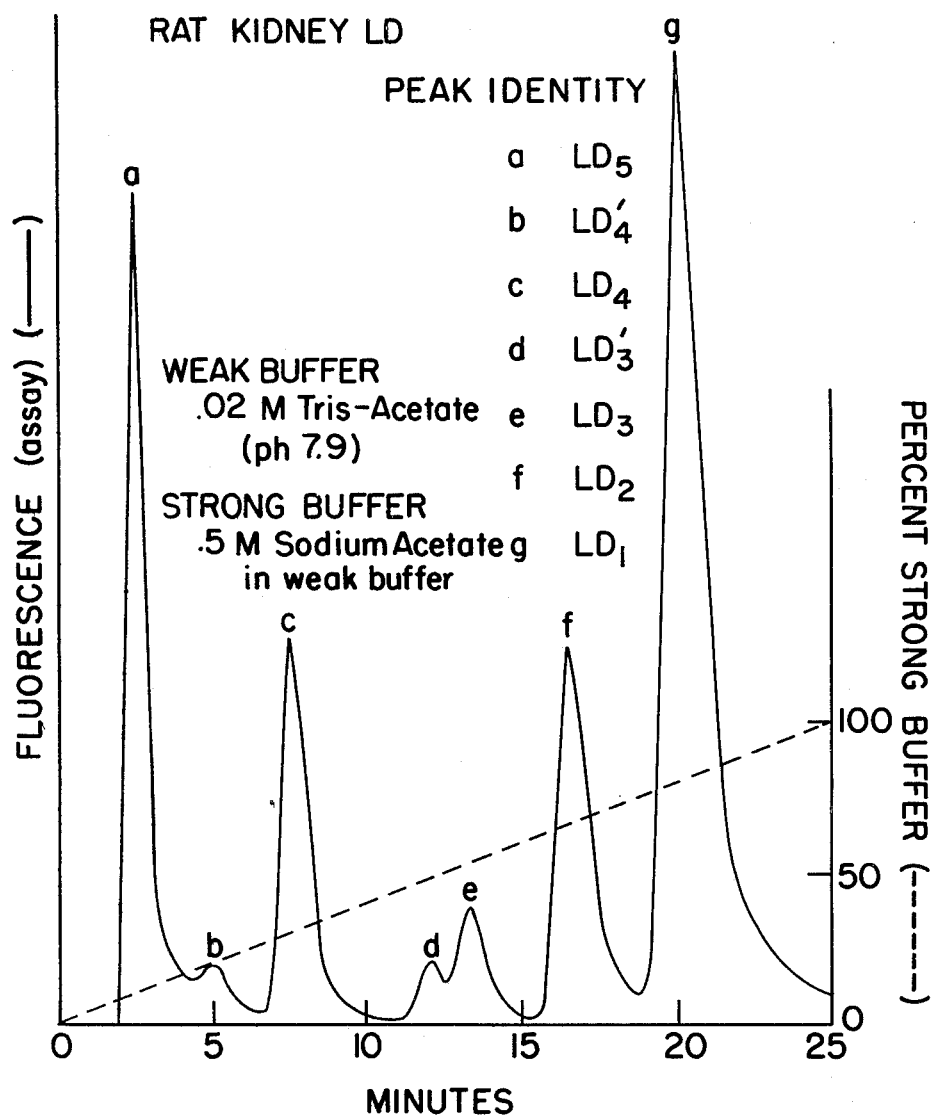
FIG. 3 is a graph illustrating activity profile of lactate dehydrogenase isoenzymes from rat kidney homogenate.

Isoenzymes were detected by monitoring their enzymatic activity with a suitable post-column reactor and detector; FIG. 3 shows the activity profile of lactate dehydrogenase isoenzymes from a rat kidney homogenate. In FIG. 3 the column was polyethyleneimine-coated LiChrospher Si 500 (10-micron particle diameter), 25×0.4 cm.; the sample was 100 μl of 105,000×g supernatant, diluted 15×; the flow rate was 1.5 ml/min; the inlet pressure was 2600 psi and the detection was post-column reactor with lactic acid and NAD; fluorescence monitored.

Silicas with a higher surface area (LiChrosorb or LiChrospher Si 100; 10-micron particle diameter) were coated, packed into columns and used to resolve mixtures of small molecules. The high IEC and selectivity of this packing permit isocratic resolution of many compounds such as carboxylic acids, as shown in FIG. 4, and phenols, as shown in FIG. 5.

Figure 4:
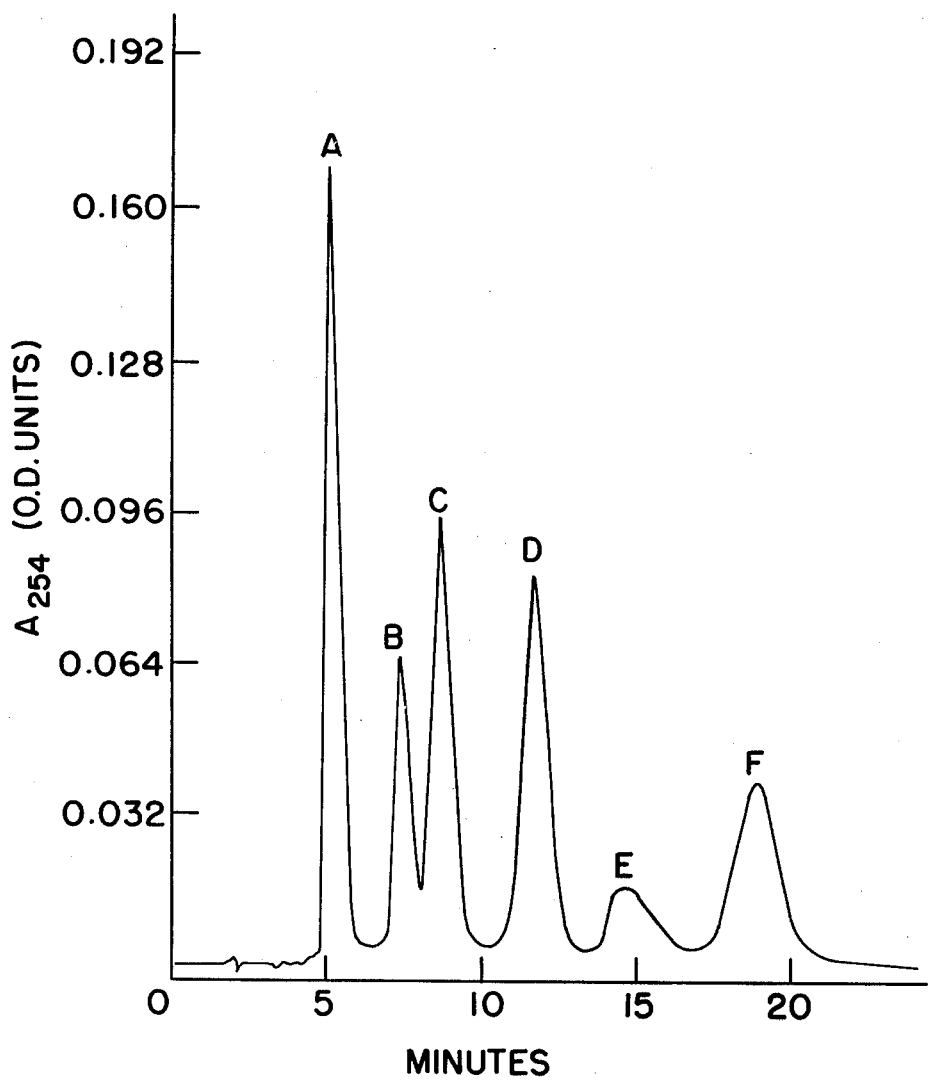
FIG. 4 is a graph illustrating isocratic resolution or carboxylic acids.

In FIG. 4, phenoxyacetic acids are shown as follows: A) Phenoxyacetic acid; B) o-Chlorophenoxyacetic acid; C) 2,6-Dichlorophenoyacetic acid; D) 2,4-Dichlorophenoxyacetic acid; E) 2,3-Dichlorophenoxyacetic acid and F) 2,4,5- Trichlorophenoxyacetic acid, with the column being polyethyleneimine-coated LiChrosorb Si 100 (10-micron particle diameter), 25×0.4 cm.; the sample being 100 μl containing 0.02 mg each compound; the eluent being 0.05 M potassium phosphate+0.1 M sodium acetate, pH 7.5; the flow rate being 1.0 ml/min; the inlet pressure being 1250 psi and the detection being $A_{254}$ monitored.

Figure 5:
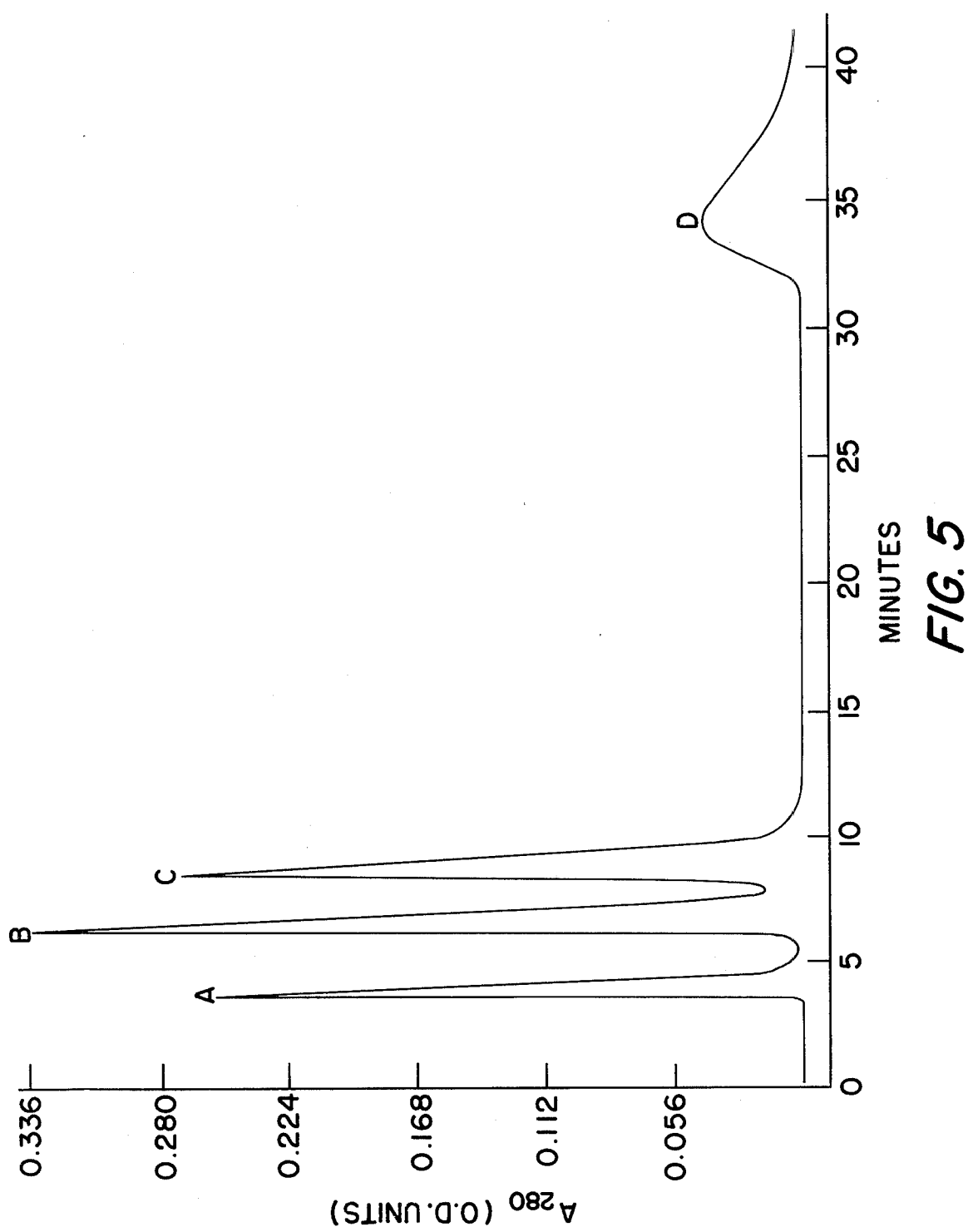
FIG. 5 is a graph illustrating isocratic resolution of phenols.

In FIG. 5, phenols are shown as follows: A) Phenol; B) Catechol; C) Resorcinol and D) Phloroglucinol, with the column being polyethyleneimine-coated LiChrosorb Si 100 (10-micron particle diameter), 25×0.4 cm.; the sample being 100 μl containing 0.1 mg each compound; the eluent being 0.05 M potassium phosphate +0.1 M sodium acetate, pH 5.5, containing 10% methanol; the flow rate being 1.0 ml/min; the inlet pressure being 950 psi and the detection being $A_{280}$ monitored.

Figure 6:
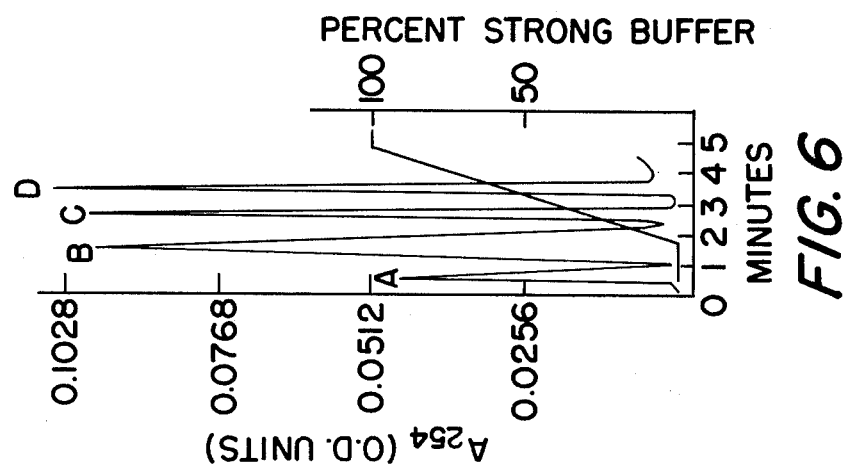
FIG. 6 is a graph illustrating resolution of mononucleotides.

Mononucleotides were resolved with a gradient, as shown in FIG. 6, for which a short (6.2 cm) column sufficed. In FIG. 6, 5'-Mononucleotides are shown as follows: A) CMP; B) AMP; C) UMP and D) GMP, with the column being polyethyleneimine-coated LiChrosorb Si 100 (10-micron particle diameter), 6.2×0.4 cm; the sample being 100 μl containing 0.07 mg each compound; the eluent being 3 min linear gradient (1.75 min delay); 0.01 M potassium phosphate, pH 3.0, to 1.0 M potassium phosphate, pH 2.0; the flow rate being 3.0 ml/min; the inlet pressure being 250 psi and the detection being $A_{254}$ monitored.

EXAMPLE 2

Figure 7:
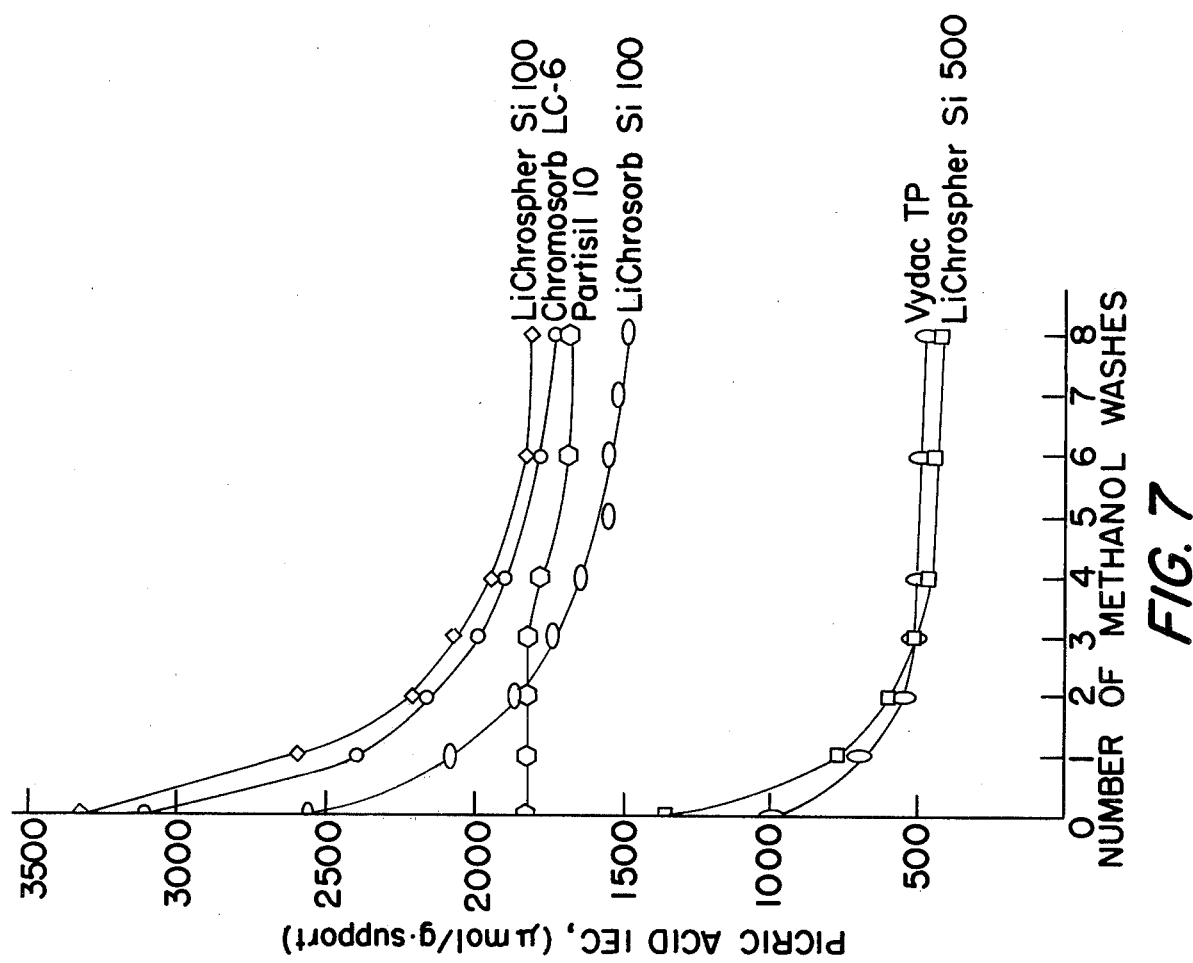
FIG. 7 is a graph illustrating retention of adsorbed polyethylimine by HPLC silicas (10-micron particle diameter) after washing with methanol.

Demonstration of the Uniform Adsorption of Amines by Porous Silica 1 to 2 grams of a porous silica (as specified hereinafter) were swirled and degassed in a 10% solution of polyethyleneimine 6 in methanol, then filtered and air-dried on a reduced-pressure funnel. 100 milligrams of the resulting coated, non-crosslinked material was removed for determination of the picric acid IEC. The remaining material was wetted and briefly slurried in the funnel with a stream of methanol, and again air-dried. This washing process was repeated eight times; after each wash, a sample of the material was removed for the picric acid assay. The graph of FIG. 7 shows that adsorbed amine is readily washed down to a tightly-retained layer, presumably a monolayer, which is reached after 4 or 5 washes. Subsequent washes remove this layer much more slowly. Commerical HPLC silicas vary by as much as a factor of 4 both in the amount of amine initially adsorbed and in the amount retained in the monolayer. This demonstrates that the adsorption is an active process, and is affected by the composition of the silica surface.

Figure 8:
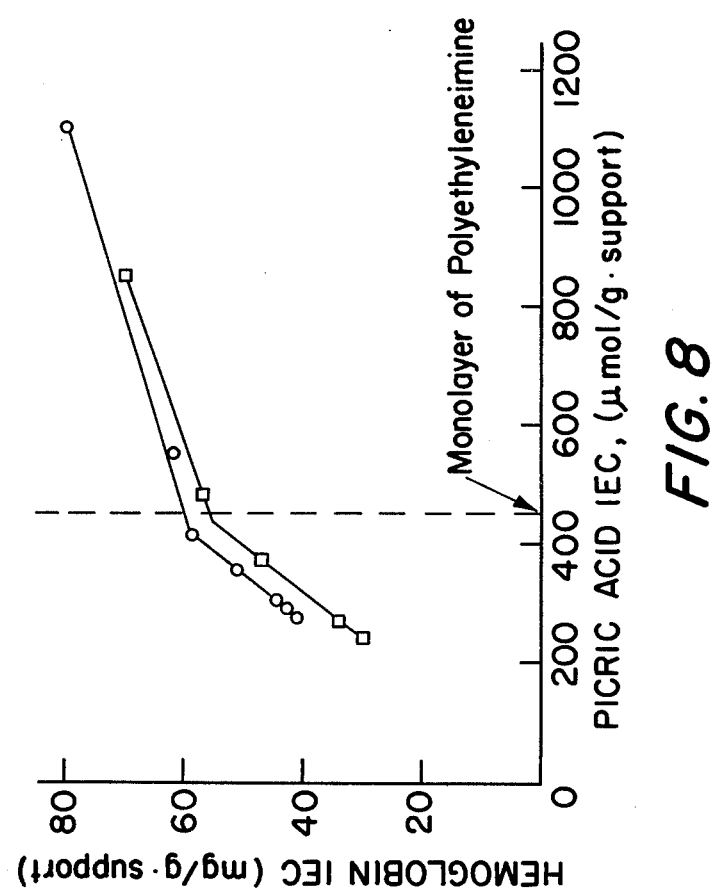
FIG. 8 i a graph illustrating hemoglobin IEC as a function of picnic acid IEC of LiChrospher Si 500 (10-micron particle diameter) with crosslinked coatings containing varying amounts of polyethyleneimine 6.

LiChrospher Si 500 (10-micron particle diameter) was coated with varying amounts of polyethyleneimine 6. The coated samples were crosslinked with a 10% solution of pentaerythritol tetraglycidyl ether in dioxane as described in Example I and were then assayed for their picric acid and hemoglobin IEC. The graph of FIG. 8 shows that the hemoglobin IEC increases rapidly with the amount of surface amine (as determined with picric acid) until the amine concentration reaches 450 micromoles per gram of coated support. As the amount of amine increases beyond that concentration, the hemoglobin IEC rises much more slowly. This indicates that a monolayer coating of polyethyleneimine 6 on this particular silica contains 450 micromoles of amine residues per gram of coated support. The same value was obtained independently in the methanol washing experiment shown in FIG. 7. These results also suggest that the silica surface is completely covered by polyethyleneimine 6 at that concentration; the coating leaves no large bare patches.

EXAMPLE 3

Preparation of a Pellicular Coating on Porous Silica With Various Amines

LiChrosorb Si 100 (10-micron particle diameter) was swirled and degassed in 10% solutions of various amines (as specified hereinafter); the products were collected by filtration and crosslinked with pentaerythritol tetraglycidyl ether as described in Example 1. The amine contents of the resulting coatings were measured with the picric acid assay, as shown in Table 1, as follows:

Table 1.

| Crosslinked amine coatings on LiChrosorb Si 100 (10-micron particle diameter) | |
|---|---|
| Adsorbed Amine | Picric Acid IEC, micromoles per gram coated support |
| N,N-Diethylethylenediamine | 310 |
| Ethylenediamine | 1450 |
| Tetraethylenepentamine | 1470 |
| 1,3-Diamino-2-hydroxypropane | 1530 |
| Polyethyleneimine 6 | 1900 |

As shown, these amines proved to be similar to each other and also to that of a monolayer of polyethyleneimine 6 on the same support; 1500–1600 micromoles of amine per gram of coated support (see FIG. 7). This suggests that any small amine in excess of a monolayer is washed off during the crosslinking process. It also suggests that there is a 1:1 relationship between the surface adsorbing sites and the number of amine residues in a monolayer, whether the amine is simple or polymeric.

An exception to these results was noted with N,N-Diethylethylenediamine which gave poor coating. This is due to the low number of active hydrogens in the molecule, which precluded extensive crosslinking. The resulting coating was unstable and washed off during the postcrosslinking treatment.

EXAMPLE 4

Use of Various Crosslinkers to Stabilize Pellicular Coatings on Porous Silica Two grams of LiChrospher Si 500 (10-micron particle diameter) were swirled and degassed in a 15% solution of polyethyleneimine 6 in methanol, then filtered out and air-dried on a reduced-pressure funnel. The coated, non-crosslinked product was divided into eight 270-milligram samples which were each crosslinked by a different agent as follows:

Sample A: Swirled and degassed in 5 ml of dioxane containing 2 millimoles of 2-methyl-2-nitro-1,3-propanediol. The mixture was left three days at room temperature, then heated 30 minutes on a steam bath with occasional swirling. Product was collected by filtration and washed with acetone, water, diethylamine, water, and again acetone, then air-dried Sample B: Swirled and degassed in 5 ml of dioxane containing 2 millimoles of 1,3-dibromopropane. The mixture was left 24 hours at room temperature, then heated 30 min on a steambath with occasional swirling. The product was then filtered and washed as was Sample A.

Sample C: Swirled and degassed in 5 ml of dioxane containing 2 millimoles of dithiobis (succinimidyl propionate). The mixture was left 24 hours at room temperature, then filtered and washed as was Sample A.

Sample D: Swirled and degassed in 5 ml of dioxane containing 2 millimoles of ethylene glycol diglycidyl ether. The mixture was left 24 hours at room temperature, then heated 40 min on a steambath with occasional swirling. The product was filtered and washed as was Sample A.

Sample E: Swirled and degassed in 5 ml of dioxane containing 2 millimoles of cyanuric chloride. The mixture was left 24 hours at room temperature, then filtered out and washed with methanol, water, diethylamine, water, methanol, and acetone, then air-dried.

Sample F: Swirled and degassed in 5 ml of 0.01 molar sodium borate buffer (ph=9.2) containing 5 millimoles of dimethyl adipimidate dihydrochloride. The mixture was left 24 hours at room temperature, then filtered. The product was washed with water, diethylamine, water, and acetone, then air-dried.

Sample G: Swirled and degassed in 5 ml of dioxane containing 2 millimoles of epichlorohydrin. The mixture was left 1.5 days at room temperature, then heated 40 min on a steambath with occasional swirling. The product was filtered and washed as was Sample A.

Sample H (Control): Swirled and degassed in 5 ml of dioxane containing no crosslinker, heated 30 min on a steambath with occasional swirling, filtered, and washed as was Sample A. The product was air-dried.

The products were assayed for their hemoglobin and picric acid IEC, as shown in Table 2 as follows:

Table 2.

IEC of Polyethyleneimine 6 Coatings on LiChrospher Si 500 (10-micron particle diameter) Crosslinked with Various Agents

| Sample | Crosslinker | Picric Acid, Micromoles | Hemoglobin, Milligrams |
|---|---|---|---|
| A | 2-Methyl-2-nitro-1,3-propanediol | 1030 | 61 |
| B | 1,3-Dibromopropane | 1850 | 58 |
| C | Dithiobis (succinimidyl propionate) | 620 | 30 |
| D | Ethylene glycol diglycidyl ether | 1580 | 55 |
| E | Cyanuric chloride | 362 | 26 |
| F | Dimethyl adipimidate dihydrochloride | 431 | 79 |
| G | Epichlorohydrin | 860 | 52 |
| H | None | 16 | 16 |

Table 2 shows that the diepoxy resin, the nitro alcohol, and the alkyl bromide crosslinkers produced good anion-exchange coatings, both for small molecules and for proteins. The other agents were less suitable for the purpose. Dimethyl adipimidate dihydrochloride was an anomalous case, yielding a coating with a low small molecule IEC but a high protein IEC.

In a similar experiment, a variety of epoxy resins were compared as crosslinking agents. 1.2 grams of LiChrosorb Si 100 (30-micron particle diameter) were coated with polyethyleneimine 6 from a 5% solution in methanol. 130-milligram samples of the product were then swirled and degassed in 5 of 10% (w/v) solutions of epoxy resins in dioxane. The mixtures were left 16 hours at room temperature, then heated 45 min on a steambath, with occasional swirling. The products were collected by filtration and washed with acetone, water, and again acetone, then air-dried. The IEC of the products were determined with the picric acid assay as shown in Table 3 as follows:

Table 3.

IEC of Polyethyleneimine 6 Coatings on LiChrosorb Si 500 (30-micron particle diameter) Crosslinked with Various Epoxy Resins

| Epoxy Resin Crosslinker | Picric Acid IEC, Micromoles per g Coated Suport |
|---|---|
| Pentaerythritol tetraglycidyl ether | 1420 |
| Epon 826 (Bisphenol A diglycidyl ether) | 1420 |
| Glyceryl diglycidyl ether | 1470 |
| Ethylene glycol diglycidyl ether | 1510 |
| Epon 812 | 1470 |

None of the coatings varied significantly in small molecule IEC. This indicates that any polyfunctional epoxy resin will produce a good, crosslinked anion-exchange coating with polyethyleneimine 6. The coating produced with Epon 826 would not be suitable for protein chromatography, since it contains aromatic residues; however, it may be useful for certain specialized applications.

The crosslinkers described in Tables 2 and 3 are characterized in terms of the general structure (heretofore set forth) in Table 4 as follows:

Table 4

Structural Characteristics of Various Crosslinkers.

| | Crossslinker (Type) | | | |
|---|---|---|---|---|
| | A | B | C | D |
| 1. | 2-Methyl-2-nitro-1,3-propanediol (A=B≠C≠D) | | | |
| | —OH | —OH | —NO$_2$ | —CH$_3$ |
| 2. | 1,3-Dibromopropane (A=B≠C=D) | | | |
| | —Br | —Br | —H | —H |
| 3. | Dithiobis (succinimidyl propionate) (A=B) | | | |

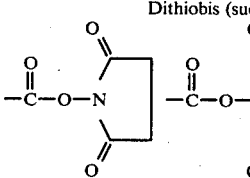

| 4. | Ethylene glycol diglycidyl ether (A=B) | | | |
|---|---|---|---|---|
| | glycidyl | glycidyl | --- | --- |
| 5. | Cyanuric chloride (A=B=C) | | | |
| | —Cl | —Cl | —Cl | --- |
| 6. | Dimethyl adipimidate dihydrochloride (A=B) | | | |

| 7. | Epichlorohydrin (A≠B≠C=D) | | | |
|---|---|---|---|---|
| | | —Cl | —H | —H |

| 8. | Pentaerythrityl tetraglycidyl ether (A=B=C=C) | | | |
|---|---|---|---|---|
| | glycidyl | glycidyl | glycidyl | glycidyl |
| 9. | Epon 826 (A=B≠C=D) | | | |
| | glycidyl | glycidyl | —CH$_3$ | —CH$_3$ |
| 10. | Glyceryl diglycidyl ether (A=B≠C≠D) | | | |
| | glycidyl | glycidyl | —OH | —H |
| 11. | Epon 812 (A=B) | | | |
| | glycidyl | glycidyl | Not Well Characterized | |

EXAMPLE 5

Preparation of a Pellicular Polyethyleneimine Coating on Various Inorganic Materials 200 milligrams of either silica, alumina or titania (see below) were swirled and degassed in a 10% solution of polyethyleneimine 6 in methanol. The materials were collected by filtration and air-dried on a reduced-pressure funnel. The coated supports were swirled and crosslinked in 10% solutions of pentaerythritol tetraglycidyl ether in dioxane, 11 hours at room temperature and then 50 minutes on a steambath with occasional swirling. The products were then filtered out, washed with acetone, water, and again acetone, then air-dried. The small molecule IEC of the resulting coatings were determined with picric acid as shown in Table 5 below. A sample of controlled-pore glass was treated similarly, except that the crosslinking was effected by a 10% solution of Epon 812. Table 5 is as follows:

Table 5.

IEC of Crosslinked Polyethyleneimine 6 Coatings on Various Inorganic Supports

| Materials | Picric Acid IEC, micromoles per g Coated Support |
|---|---|
| LiChrosorb Si 100 (10-micron particle diameter) | 1980 |
| Controlled-pore glass (5-10-micron particle diameter; 100 A pore diameter) | 1600 |
| Spherisorb alumina (10-micron particle diameter; 150 A pore diameter) | 780 |
| Bio-Rad basic alumina, Activity I (40-micron particle diameter) | 660 |
| Bio-Rad acid alumina, Activity I (40-micron particle diameter) | 620 |
| Corning titania (40/60 mesh; pore diameter = 400 A) | 290 |

Since alumina and titania are denser than silica, then comparing their coatings on the basis of support mass rather than volume leads to an underestimation of the performance of a column packed with coated alumina or titania. Such columns may be useful for applications at high pH, where silica is not stable.

The pellicular anion-exchange coating (as described in Example 1, for example) has the following advantages over silane-based, covalently-bonded anion exchange coatings:

(a) Ion-exchange capacity: The IEC of a supppot with a pellicular coating is up to 20 times greater than that of a support with a coating of an amine-containing silane. This permits resolution of some compounds, such as carboxylic acids, without a gradient. It also affords more efficient separations of substances such as proteins and nucleotides which are resolved with gradients.

(b) Reproducibility: The IEC of different batches of HPLC supports with pellicular coatings differs by less than 10%.

(c) Durability: Silane-based anion-exchange coatings are reported to degrade when eluted with aqueous buffers. No such degradation is observed with pellicular coatings, which are as stable as the underlying silica in aqueous media. Columns packed with pellicular materials last significantly longer than those with silane-based materials before the column fails, indicating that the pellicular coating also protects the underlying silica to some extent.

Thus, this invention provides a high-capacity ion-exchange coating which can be applied to all inorganic materials used in high-performance liquid chromatography, whether porous or non-porous.

The use of various amines, crosslinkers or inorganic materials is described in the examples set forth hereinabove and adsorption of the pellicular layer through an alternative force to ionic attraction is also described.

In the examples given, the adsorption of the amine and its crosslinking on the surface of the support were performed with two different solutions. It is possible, however, to prepare a pellicular coating with a single solution containing both amine and crosslinker. One such procedure is to swirl and degas a support in a solution containing polyethyleneimine 6 and a polyfunctional epoxy resin. The material is collected by filtration and heated for one hour in an oven at 80°. The product has a picric acid IEC equal to that of a material where the crosslinking was effected in a second solution. However, this method of preparation is not considered preferred since it could give less reproducible results and could tend to cement the support particles together.

While the invention is well suited for use in liquid chromatography, materials with a pellicular amine coating could also be used in the field of industrial water processing. For example, inexpensive silicas with such a coating could be used to chelate metal ions and remove them from solution through simple filtration, and strongly anionic wastes could also be removed by such a procedure. In addition, immobilization of enzymes of industrial interest through adsorption could be carried out with the same inexpensive silicas. Such enzymes would retain their activity, and could be recovered through simple filtration of the mixture after their use as catalysts.

As can be appreciated from the foregoing, this invention provides an improved process for producing a pellicular coating on a support material as well as an improved support with a thin coating adsorbed to and crosslinked on the support material.

What is claimed is:

1. A process for producing a pellicular coating on a support material, said process comprising:
   providing a support material having a surface with an affinity for an adsorbate;
   contacting the surface of said support material with an adsorbate such that a pellicular coating of said adsorbate is adsorbed to said surface by electrostatic forces; and
   causing said coating adsorbed to said surface to be crosslinked thereon.

2. The process of claim 1 wherein said support material is an inorganic provided from the group consisting of silica, alumina and titania.

3. The process of claim 1 wherein said support material is an inorganic support provided from the group consisting of LiChrospher Si 500 (10-micron particle diameter), LiChrosorb Si 100 (10-micron particle diameter), LiChrospher Si 100 (10-micron particle diameter), Chromosorb LC-6,Partisil 10, Vydac$_{tp}$, controlled-pore glass (5-10-micron particle diameter; 100 Å pore diameter), Spherisorb alumina (10-micron particle diameter; 150 Å pore diameter), Bio-Rad basic alumina, Activity I (40-micron particle diameter), Bio-Rad acid alumina, Activity I (40-micron particle diameter), Corning titania (40/60 mesh; pore diameter=400 Å).

4. The process of claim 1 wherein said adsorbate includes functional groups, one of which interacts with the surface of said support material to cause adsorption thereat and the other of which is used for crosslinking.

5. The process of claim 4 wherein said functional groups may be the same or different functional groups.

6. The process of claim 4 wherein said crosslinking is caused by a crosslinker that includes a plurality of functional groups that react with said functional group of said adsorbate used for crosslinking.

7. The process of claim 1 wherein said adsorbate is an amine that is brought into contact with said surface of said support material.

8. The process of claim 7 wherein said amine is selected from the group consisting of polyethyleneimine 6, 1,3-Diamino-2-hydroxypropane, tetraethylenepentamine, and ethylenediamine.

9. The process of claim 1 wherein said coating on said surface is crosslinked by exposure of said surface to a crosslinker selected from the group consisting of alkyl bromide, epoxy resin and nitro alcohol.

10. The process of claim 9 wherein said alkyl bromide is 1,3-Dibromopropane and wherein said nitro alcohol is 2-Methyl2-nitro-1,3-propanediol.

11. The process of claim 9 wherein said epoxy resin is a polyfunctional epoxy resin.

12. The process of claim 11 wherein said epoxy resin is selected from the group consisting of pentaerythritol tetraglycidyl ether, Epon 826 (Bisphenol A diglycidyl ether), glyceryl diglycidyl ether, ethylene glycol diglycidyl ether and Epon 812.

13. The process of claim 1 wherein said process includes controlling contact of said adsorbate with the surface of said support material whereby substantially only a monolayer of material is uniformly deposited on said surface to form said coating thereon.

14. The process of claim 13 wherein said adsorption of said adsorbate to said surface is self-limiting.

15. The process of claim 14 wherein said adsorbate is included in a solvent and wherein adsorption is at least partially established by controlling the polarity of said solvent.

16. The process of claim 1 wherein said pellicular coating is a stable ion-exchange coating for liquid chromatography with such crosslinked adsorbed coating being substantially a monolayer in thickness.

17. The process of claim 1 wherein said adsorbate is brought into contact with said support material to form said coating thereon before exposure to said crosslinker to crosslink said coating on said surface.

18. The process of claim 1 wherein said adsorbate and crosslinker are mixed prior to said adsorbate being brought into contact with said support material.

19. A pellicular coated support material, comprising:
a support material having a surface with an affinity for an adsorbate; and
a pellicular layer of adsorbate adsorbed by electrostatic forces to and cross-linked on said surface of said support material.

20. The support material of claim 19 wherein said porous inorganic support is selected from the group consisting of LiCrospher Si 500, LiChrosorb Si 100, LiChrospher Si 100, Chromosorb LC-6, Partisil 10, Vydac$_{tp}$, control-pore glass, Spherisorb alumina, Bio-Rad basic alumina, Activity I, Bio-Rad acid alumina, Activity I and corning titania.

21. The support material of claim 19 wherein said support consists of particles of about 5–240 micron particle diameter.

22. The support material of claim 19 wherein said material includes a crosslinker.

23. The support material of claim 19 wherein said coated support provides a stable ion-exchange coating for liquid chromatography.

24. The support material of claim 19 wherein said coating is substantially a monolayer in thickness.

25. The support material of claim 19 wherein said pellicular layer of adsorbate is a uniform and stable continuous skin on said support.

26. The support material of claim 25 wherein said skin is a film of organic molecules on said surface of said support with said film having a thickness of about 1 to a few molecules with adjacent molecules crosslinked.

27. The support material of claim 19 wherein said adsorbate includes at least two functional groups, one of which is for adsorption of of said adsorbate to said surface of said support and the other of which is for crosslinking of said adsorbate.

28. The support material of claim 27 wherein said functional groups are the same or different functional groups.

29. The support material of claim 28 wherein said adsorbate is crosslinked by a crosslinker having different functional groups.

30. The support material of claim 19 wherein said adsorbate is an amine.

31. The support material of claim 30 wherein said amine is selected from the group consisting of polyethyleneimine 6, 1,3-Diamino-2-hydroxpropane, tetraethylenepentamine and ethylenediamine.

32. The support material of claim 19 wherein said crosslinker is selected from the group consisting of alkyl bromide, epoxy resin and nitro alcohol.

33. The support material of claim 32 wherein said crosslinker is selected from the group consisting of pentaerythritol tetraglycidyl ether, Epon 826 (Bisphenol A diglycidyl ether), glyceryl diglycidyl ether, ethylene glycol diglycidyl ether, Epon 812, 1,3 dibromopropane, 2- Methyl-2-nitro-1,3-propanediol and dimethyl adipimidate dihydrochloride.

34. The support material of claim 19 wherein said support is an inorganic support.

35. The support material of claim 34 wherein said inorganic support is selected from the group consisting of silica, alumina and titania.

36. A chromatographic packing material, comprising:
an inorganic support material having a surface area, said support being selected from the group consisting of silica, alumina and titania; and
a thin layer of an amine adsorbed to and crosslinked on said inorganic support material, said amine being selected from the group consisting of polyethyleneimine 6, 1,3-diamino-2-hydroxypropane, tetraethylenepentamine and ethylenediamine, and with said amine being crosslinked by a cross-linking agent selected from the group consisting of alkyl bromide, epoxy resin and nitro alcohol.

37. The chromatographic packing material of claim 36 wherein said epoxy resin is selected from the group consisting of pentaerythritol tetraglycidyl ether, Epon 826 (Bisphenol A diglycidyl ether), glyceryl diglycidyl ether, ethylene glycol diglycidyl ether and Epon 812.

38. The chromatographic packing material of claim 36 wherein said thin layer is substantially a uniform monolayer in thickness.

* * * * *